(12) United States Patent
Mori et al.

(10) Patent No.: US 10,748,536 B2
(45) Date of Patent: Aug. 18, 2020

(54) ELECTRONIC DEVICE AND CONTROL METHOD

(71) Applicant: LENOVO (SINGAPORE) PTE. LTD., Singapore (SG)

(72) Inventors: Hidehisa Mori, Yokohama (JP); Masaharu Yoneda, Yokohama (JP); Koji Kawakita, Yokohama (JP); Toshikazu Horino, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 163 days.

(21) Appl. No.: 16/106,071

(22) Filed: Aug. 21, 2018

(65) Prior Publication Data

US 2019/0362714 A1    Nov. 28, 2019

(30) Foreign Application Priority Data

May 24, 2018   (JP) ................................. 2018-099859

(51) Int. Cl.
*G10L 15/22* (2006.01)
*G10L 25/84* (2013.01)
*G10L 15/08* (2006.01)

(52) U.S. Cl.
CPC .............. *G10L 15/22* (2013.01); *G10L 15/08* (2013.01); *G10L 25/84* (2013.01); *G10L 2015/088* (2013.01); *G10L 2015/223* (2013.01)

(58) Field of Classification Search
CPC combination set(s) only.
See application file for complete search history.

(56) References Cited

U.S. PATENT DOCUMENTS

| | | | |
|---|---|---|---|
| 6,202,050 B1* | 3/2001 | Chen | G10L 25/78 704/270 |
| 6,963,836 B2* | 11/2005 | Van Gestel | G06F 3/16 704/251 |
| 8,731,912 B1* | 5/2014 | Tickner | H04M 19/04 704/208 |
| 9,254,798 B1* | 2/2016 | Mostafa | B60R 16/03 |
| 9,472,206 B2* | 10/2016 | Ady | G06F 3/017 |
| 9,600,231 B1* | 3/2017 | Sun | G10L 15/14 |
| 10,165,108 B1* | 12/2018 | Douglas | H04L 63/0861 |
| 10,388,280 B2* | 8/2019 | Agrawal | G10L 15/22 |
| 10,431,188 B1* | 10/2019 | Nelson | G06Q 10/0833 |

(Continued)

FOREIGN PATENT DOCUMENTS

JP   2009-099064 A   5/2009

*Primary Examiner* — Abdelali Serrou
(74) *Attorney, Agent, or Firm* — Shimokaji IP (57) ABSTRACT

An electronic device includes: a first processing circuit configured to detect voice from ambient sounds in first processing, and when detecting voice after a state of detecting no voice continues for a first period of time or longer, shift procedure to second processing; a second processing circuit configured to determine whether the voice detected from the ambient sound includes a specific word or not in the second processing, while being configured, when the specific word appears within a second period of time after the shifting to the second processing, to shift the procedure to third processing, and, when the specific word does not appear within the second period of time, not to shift the procedure to the third processing; and a third processing circuit configured to activate the specific function in the third processing.

5 Claims, 5 Drawing Sheets

(56) References Cited

U.S. PATENT DOCUMENTS

| | | | |
|---|---|---|---|
| 10,490,207 B1* | 11/2019 | Talwar | G10L 15/22 |
| 10,559,309 B2* | 2/2020 | Carbune | G10L 15/22 |
| 10,616,726 B1* | 4/2020 | Freeman, II | H04W 8/02 |
| 2005/0114132 A1* | 5/2005 | Hsu | G06F 3/167 |
| | | | 704/251 |
| 2005/0245203 A1* | 11/2005 | Vance | H04L 65/4061 |
| | | | 455/79 |
| 2008/0260180 A1* | 10/2008 | Goldstein | G10L 19/00 |
| | | | 381/110 |
| 2009/0029679 A1* | 1/2009 | Hu | H04M 3/436 |
| | | | 455/412.1 |
| 2011/0112833 A1* | 5/2011 | Frankel | G10L 15/32 |
| | | | 704/235 |
| 2012/0123773 A1* | 5/2012 | Zeng | G10L 21/0272 |
| | | | 704/226 |
| 2013/0204622 A1* | 8/2013 | Lu | G06F 3/167 |
| | | | 704/251 |
| 2014/0297288 A1* | 10/2014 | Yu | G10L 15/30 |
| | | | 704/275 |
| 2014/0347272 A1* | 11/2014 | Hernandez-Abrego | G06F 3/005 |
| | | | 345/156 |
| 2014/0372126 A1* | 12/2014 | Ady | G06F 3/167 |
| | | | 704/270.1 |
| 2015/0081296 A1* | 3/2015 | Lee | G10L 15/20 |
| | | | 704/239 |
| 2015/0281778 A1* | 10/2015 | Xhafa | H04N 21/2187 |
| | | | 386/292 |
| 2015/0302855 A1* | 10/2015 | Kim | G10L 17/22 |
| | | | 704/275 |
| 2015/0379985 A1* | 12/2015 | Wang | G10L 15/07 |
| | | | 704/250 |
| 2016/0036962 A1* | 2/2016 | Rand | H04M 1/72563 |
| | | | 455/418 |
| 2016/0085498 A1* | 3/2016 | Chee | G06F 3/165 |
| | | | 704/201 |
| 2016/0148615 A1* | 5/2016 | Lee | G10L 15/22 |
| | | | 704/275 |
| 2017/0083285 A1* | 3/2017 | Meyers | G10L 15/00 |
| 2017/0133041 A1* | 5/2017 | Mortensen | G10L 25/78 |
| 2017/0154176 A1* | 6/2017 | Yun | G10L 15/22 |
| 2017/0169817 A1* | 6/2017 | VanBlon | G10L 15/02 |
| 2018/0033428 A1* | 2/2018 | Kim | G10L 21/028 |
| 2018/0090145 A1* | 3/2018 | Kume | G10L 13/033 |
| 2018/0173494 A1* | 6/2018 | Choi | G10L 15/08 |
| 2019/0222684 A1* | 7/2019 | Li | H04M 1/72519 |

\* cited by examiner

ELECTRONIC DEVICE AND CONTROL METHOD

FIELD OF THE INVENTION

The present invention relates to an electronic device, a control method and a program.

BACKGROUND OF THE INVENTION

Electronic devices having voice assistant functions are available (see Japanese Unexamined Patent Application Publication No. 2014-170185). The functions include voice recognition of the contents of user's utterance, response to the utterance, and execution of processing corresponding to an instruction based on the utterance.

SUMMARY OF THE INVENTION

When a user uses a specific function like the voice assistant as stated above, the user may talk to the electronic device with a keyword (a specific word) so as to activate the function of the device. When the conversation includes such a keyword or when the conversation includes a word similar to the keyword in sound, such a device erroneously may activate without the user's intent of using the voice assistant. In such a case, the function such as voice assistant may react at a timing that the user does not intend.

In order to solve the above problem, the present invention aims to provide an electronic device, a control method and a program capable of reducing the false acceptance ratio of the electronic device when a user talks to the electronic device with a keyword to execute a specific function.

To solve the above problem, an electronic device according to the first aspect of the present invention includes: a first processing circuit configured to detect voice from ambient sounds in first processing, and when detecting voice after a state of detecting no voice continues for a first period of time or longer, shift procedure to second processing; a second processing circuit configured to determine whether the voice detected from the ambient sounds includes a specific word or not in the second processing, while being configured, when the specific word appears within a second period of time after the shifting to the second processing, to shift the procedure to third processing, and, when the specific word does not appear within the second period of time, not to shift the procedure to the third processing; and a third processing circuit configured to activate the specific function in the third processing.

When the specific word does not appear within the second period of time after the shifting to the second processing, the second processing circuit may shift the procedure to the first processing.

The third processing circuit may execute answering processing based on contents of the detected voice that are recognized by voice recognition in the third processing.

At least one of the first period of time and the second period of time may be set based on region setting or language setting.

A user can set at least one of the first period of time and the second period of time.

A control method in an electronic device according to the second aspect of the present invention includes: detecting voice from ambient sounds in first processing, and when voice is detected after a state of detecting no voice continues for a first period of time or longer, shifting procedure to second processing; determining whether the voice detected from the ambient sounds includes a specific word or not in the second processing, while when the specific word appears within a second period of time after the shifting to the second processing, shifting the procedure to third processing, and, when the specific word does not appear within the second period of time, shifting the procedure to the first processing; and activating a specific function in the third processing.

The above-described aspects of the present invention can reduce the false acceptance ratio of the electronic device when a user talks to the electronic device with a keyword to execute a specific function.

DETAILED DESCRIPTION OF THE INVENTION

Referring to the attached drawings, the following describes an embodiment of the present invention in details. In the attached drawings, like numbers indicate like components.

The present embodiment describes an example of a voice assistant system including a PC (Personal Computer) having a function of voice assistant. When a user talks to the PC with a specific word (hereinafter called a "keyword"), such a voice assistant function automatically activates. Note here that voice assistant refers to the function of performing voice recognition of the contents of user's utterance and outputting a response to the utterance. For instance, based on the utterance of the user, the voice assistant can provide various types of information about weather, news, shops and sightseeing area, or can stream various contents, such as videos and music. In an example of the weather information, when the user's utterance is "What's the weather today?", the voice assistant refers to a site providing weather information and provides an answer about the today's weather forecast at the current place (e.g., "It's going to be sunny today"). The answer may be given as an audio output by voice synthesis or as an output on the display with text and images, or may be given using both of them.

When a keyword to activate the voice assistant is included in a series of conversation or when the conversation includes a word similar to the keyword in sound, the voice assistant may erroneously activate without the user's intent of using the voice assistant. In this case, since the voice assistant reacts at a timing that the user does not intend, the user's conversation or work may be interrupted. The user may feel that the voice assistant keeps the ears turned toward the conversation, and so may feel uncomfortable. In this case, the user may disable the function of voice assistant so that the voice assistant does not work, and so the voice assistant function of the PC will be wasted.

Figure 1:
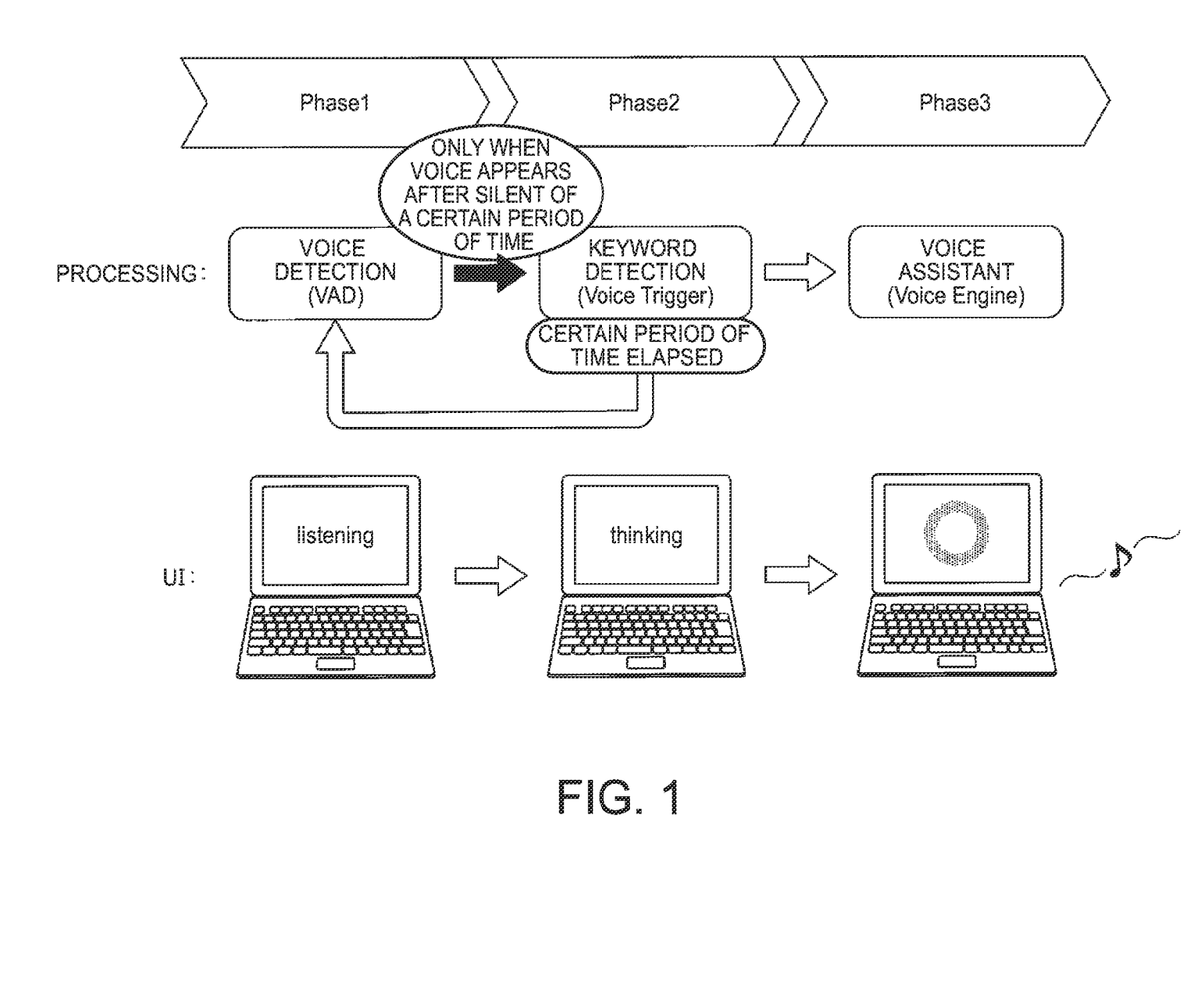
FIG. 1 schematically shows the activation control processing of voice assistant according to the present embodiment.

The present embodiment therefore controls the activation of the voice assistant so that the voice assistant activates when the user talks to the device with a keyword having the intention of using the voice assistant, and inhibits the activation of the voice assistant if the keyword is just included in a series of conversation or if the conversation includes a word similar to the keyword in sound. Referring to FIG. 1, the following briefly describes the activation control processing of voice assistant.

FIG. 1 schematically shows the activation control processing of voice assistant according to the present embodiment. This activation control processing of voice assistant includes the procedure of "Phase1", "Phase2" and "Phase3" that are performed in this order. "Phase1" is processing to detect voice from the ambient sound (VAD: Voice Activity Detection). "Phase2" is processing of Voice Trigger. In this processing, when voice is detected in "Phase1", the voice is checked for matching with a keyword. When the keyword is detected, an instruction is issued to activate the voice assistant. "Phase3" is to activate the voice assistant in response to the instruction at "Phase2" to activate the voice assistant (Voice Engine). In each Phase in the drawing, the PC has a state of listening to voice in "Phase1" (listening), has a state of matching of the voice with a keyword in "Phase2" (thinking), and has a state of activating the voice assistant and outputting a start-up sound in "Phase3".

When a keyword is included in a series of conversation or when the conversation includes a word similar to the keyword in sound, this means that the keyword (or a word similar to the keyword) is detected in the continuously detected voice. On the contrary, when the user talks to the PC with a keyword with the intention of using the voice assistant, the user tends to talk to the PC after silent of a certain period of time. In this way, the keyword in this case is typically detected within a certain period of time that follows the silent of a certain period of time (without voice). Even when the user talks to the PC with a keyword with the intention and without silent of a certain period of time intervening at the end of a series of conversation, if the voice assistant does not give any answer, then the user may talk to the PC again with the keyword after inserting silent of a certain period of time.

Then the voice assistant system of the present embodiment is configured as shown in the drawing so that, when voice is detected after silence of a certain period of time (without voice) in "Phase1", the procedure shifts to "Phase2", and when a keyword is detected within a certain period of time after the shifting to "Phase2", the procedure shifts to "Phase3" to activate the voice assistant. The voice assistant system of the present embodiment is configured so that when a keyword is not detected within a certain period of time after the shifting to "Phase2", the procedure returns to "Phase1". In other words, the voice assistant system of the present embodiment is configured so that once the procedure shifts to "Phase2" and if a keyword is detected after the elapse of a certain period of time or longer of continuous conversation, the voice assistant system determines that the user does not intend to use the voice assistant and stops the detection of the keyword. Then the voice assistant system returns the procedure to "Phase1", and when voice is detected again after silence of a certain period of time (without voice), the system resumes the detection of the keyword.

In this way, the present embodiment can lower the false acceptance ratio (FAR) indicating the ratio of erroneous activation of the voice assistant due to a keyword in a conversation or a word similar to the keyword, and so can activate the voice assistant correctly at a timing that the user intends. For instance, a conventional system is configured so that when the procedure shifts to "Phase2" because "Phase1" detects voice, the detection of a keyword is continued until the keyword is detected. Therefore if the keyword is included in a series of conversation or when the conversation includes a word similar to the keyword in sound, the voice assistant may activate erroneously without the user's intent of using the voice assistant. In the present embodiment, when voice is detected within a certain period of time after silence of a certain period of time (without voice), the system activates the voice assistant. This can reduce the activation of the voice assistant when the user does not intend to use the voice assistant.

The following describes the configuration of a voice assistant system according to the present embodiment in details.

Figure 2:
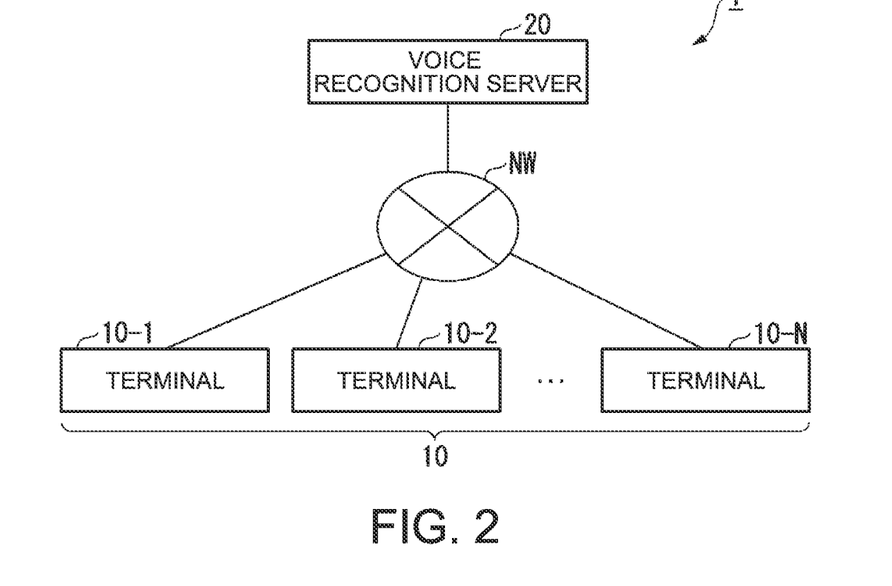
FIG. 2 shows an example of the configuration of the voice assistant system according to the present embodiment.

FIG. 2 shows an example of the configuration of the voice assistant system according to the present embodiment. The voice assistant system 1 shown in the drawing includes a plurality of terminals 10 (10-1, 10-2, . . . 10-N, where N denotes a natural number) and a voice recognition server 20. Each of the plurality of terminals 10 is connected to the voice recognition server 20 for communication via a network NW.

The network NW may be a communication network, such as a mobile telephone network, a PHS (Personal Handyphone System) network, a VPN (Virtual Private Network), a private communication network, a WAN (Wide Area Network), a LAN (Local Area Network), a PSTN (Public Switched Telephone Network), or a combination of these networks.

The terminal 10 is a computer device that a user operates, which may be an electronic device, such as a desktop PC, a laptop PC or a tablet PC. The terminal 10 may be a mobile phone, such as a smartphone, or an electronic device, such as a smart speaker. The terminal 10 in cooperation with the voice recognition server 20 implements the function of voice assistant. For instance, when the voice assistant activates at the timing when the procedure shown in FIG. 1 shifts to "Phase3", then the terminal 10 detects voice uttered by the user, and transmits an audio signal of the detected voice to the voice recognition server 20 via the network NW.

The voice recognition server 20 performs voice recognition of the audio signal transmitted from the terminal 10 and transmits information on a recognition result (that is, the contents of the user's utterance) to the terminal 10. Based on the information on a recognition result acquired from the voice recognition server 20, the terminal 10 outputs an answer corresponding to the contents of the user's utterance. For instance, based on the utterance of the user, the terminal 10 outputs information in the form of voice or images about weather, news, shops and sightseeing area, for example, or streams various contents, such as video contents and music contents.

The voice recognition server 20 may perform voice recognition of the audio signal transmitted from the terminal 10, and may generate an answer corresponding to the contents of the user's utterance and provide the answer to the terminal 10. For instance, based on the utterance of the user, the voice recognition server 20 may transmit information about weather, news, shops and sightseeing area, for example, to the terminal 10 or may transmit a streaming signal of various contents, such as video contents and music contents to the terminal. Then the terminal 10 may acquire the answer corresponding to the contents of the user's utterance from the voice recognition server 20 for outputting.

Figure 3:
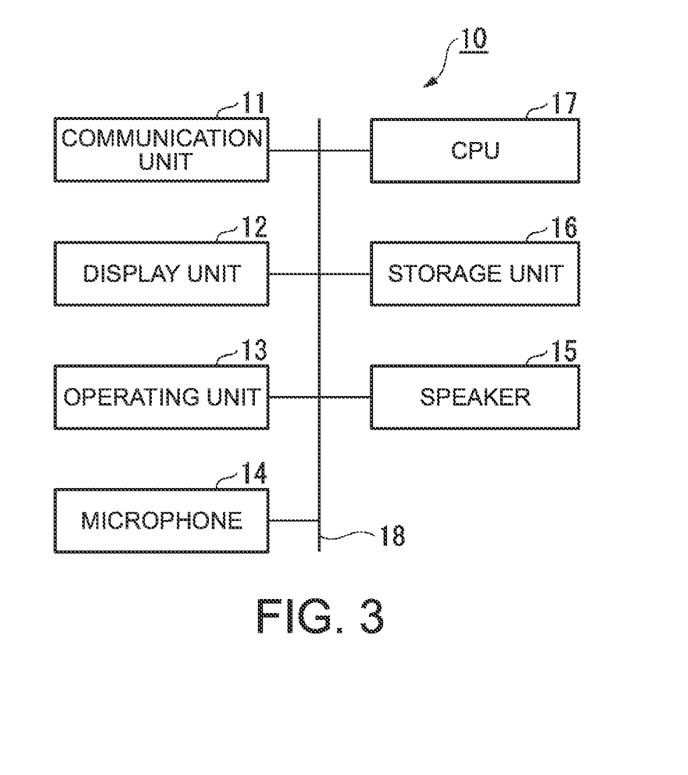
FIG. 3 is a block diagram showing one example of the hardware configuration of the terminal according to the present embodiment.

FIG. 3 is a block diagram showing one example of the hardware configuration of the terminal 10 according to the present embodiment. The terminal 10 includes a communication unit 11, a display unit 12, an operating unit 13, a microphone 14, a speaker 15, a storage unit 16, and a CPU (Central Processing Unit) 17. These units are connected mutually so as to be communicable via a bus 18.

The communication unit 11 may include a plurality of Ethernet (registered trademark) ports, a plurality of digital input/output ports, such as a USB, and a wireless LAN port, and communicates with the voice recognition server 20 and other devices via the network NW under the control of the CPU 17.

The display unit 12 is a display to display information in the form of images of text, for example, which may include a liquid crystal display panel or an organic EL (ElectroLuminescence) display panel, for example. The operating unit 13 is an input device, such as a keyboard, a mouse or a touch pad, to receive the operation by a user and output an operating signal based on the received operation by the user. The operating unit 13 may be a touch panel that is integral with the display (display unit 12).

The microphone 14 detects the ambient sound and converts it into an audio signal for outputting. For instance, when the microphone 14 receives sound such as utterance of a user as an input, the microphone converts the input sound into an audio signal for outputting. The speaker 15 outputs voice based on the audio signal that the audio assistant function generates as an answer, for example.

The storage unit 16 may include a HDD (Hard Disk Drive), a SSD (Solid State Drive), an EEPROM (Electrically Erasable Programmable Read-Only Memory), a ROM (Read-Only Memory) or a RAM (Random Access Memory) to store various types of information, images, programs and the like that the terminal 10 processes. The storage unit 16 is not limited to the one internally included in the terminal 10, which may be an external storage device that is connected via a digital input/output port, such as a USB.

The CPU 17 executes various types of programs stored in the storage unit 16 to control various parts of the terminal 10. The terminal 10 may include a hardware configuration, such as a camera, a gyroscopic sensor, or a GPS (Global Positioning System) receiving module, which are not illustrated.

Figure 4:
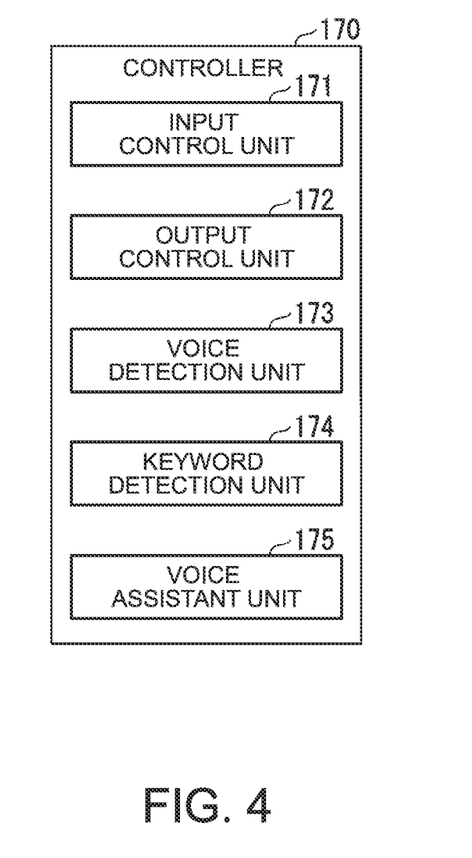
FIG. 4 is a block diagram showing one example of the functional configuration of the terminal according to the present embodiment.

Referring next to FIG. 4, the following describes the functional configuration of the terminal 10. FIG. 4 is a block diagram showing one example of the functional configuration of the terminal 10 according to the present embodiment. The terminal 10 includes a controller 170 that is a functional configuration implemented when the CPU 17 executes a program (e.g., a voice assistant control program) stored in the storage unit 16. FIG. 4 is a block diagram showing one example of the functional configuration of the controller 170 of the terminal 10 according to the present embodiment. The controller 170 includes an input control unit 171, an output control unit 172, a voice detection unit 173, a keyword detection unit 174, and a voice assistant unit 175.

The input control unit 171 acquires an operating signal output from the operating unit 13. The input control unit 171 acquires an audio signal output from the microphone 14 as well.

The output control unit 172 controls the display of the display unit 12. The output control unit 172 controls sound (e.g., voice) output from the speaker 15 as well.

The voice detection unit 173 detects voice (human voice) from the ambient sound. For instance, the voice detection unit 173 analyzes the frequency of an audio signal acquired from the microphone 14 via the input control unit 171 to detect voice from the sound input into the microphone 14. When the voice detection unit 173 detects the voice after the state of detecting no voice continues for a certain period of time (e.g., 2 seconds) or longer (i.e., after silence of a certain period of time (without voice)), then the voice detection unit shifts the procedure to the processing by the keyword detection unit 174. For instance, the voice detection unit 173 compares with a preset first determination time so as to determine whether the state of detecting no voice continues for a certain period of time or longer. This first determination time is set beforehand, which is a threshold value to determine that a conversation does not continue. In the following, this first determination time may be called "voice detection determination time".

For instance, when the voice detection unit 173 detects voice after the state of detecting no voice continues for the voice detection determination time or longer in "Phase1" (see FIG. 1), meaning that the voice is detected after silence of a certain period of time (without voice), then the voice detection unit shifts the procedure to "Phase2" (see FIG. 1). On the contrary, when the voice detection unit 173 detects voice continuously (or intermittently) and the state of detecting no voice does not continue for the voice detection determination time or longer in "Phase1", then the voice detection unit does not shift the procedure to "Phase2" in response to such detection of the voice. Then the voice detection unit continues the voice detection processing.

When the voice detection unit 173 detects voice after the state of detecting no voice continues for a certain period of time or longer, then the keyword detection unit 174 detects whether the voice detected by the voice detection unit 173 includes a keyword or not. For instance, the keyword detection unit 174 checks the voice detected by the voice detection unit 173 for matching with a preset keyword (a keyword to activate the voice assistant) so as to determine whether the voice includes the keyword or not.

Following the detection of voice after the state of detecting no voice by the voice detection unit 173 continues for a certain period of time or longer (i.e., shifting from "Phase1" to "Phase2"), when the keyword detection unit 174 detects a keyword included within a certain period of time (e.g., 5 seconds), the keyword detection unit instructs to activate the voice assistant (i.e., shift the procedure to "Phase3" (see FIG. 1)). For instance, the keyword detection unit 174 compares with a preset second determination time so as to determine whether a keyword appears within a certain period of time after shifting to "Phase2". This second determination time is set beforehand, which is a threshold value to determine that a conversation does not continue for a certain period of time or longer (i.e., it is not during a series of conversation). In the following, this second determination time may be called "keyword detection determination time".

For instance, when the keyword detection unit 174 detects a keyword within the keyword detection determination time after the shifting to "Phase2", this means that the keyword appears within the certain period of time. Therefore the keyword detection unit determines that the user talks to the PC with the keyword with the intention of using the voice assistant. Then the keyword detection unit 174 instructs to activate the voice assistant and shift to "Phase3".

On the contrary, when the keyword detection unit 174 does not detect a keyword within the keyword detection determination time after the shifting to "Phase2", this means that the keyword does not appear within the certain period of time. Therefore the keyword detection unit determines that, even when a keyword is detected after that, the user happened to speak such a keyword during a series of conversation. Therefore the keyword detection unit 174 does not instruct to activate the voice assistant (i.e., not shift to "Phase3"). For instance, when the keyword detection unit 174 does not detect a keyword within the keyword detection determination time, the keyword detection unit may stop the keyword detection processing and return the procedure to "Phase1".

When receiving an instruction to activate the voice assistant from the keyword detection unit 174, the voice assistant unit 175 activates the voice assistant. For instance, the voice assistant unit 175 activates the voice assistant while letting the output control unit 172 control the speaker 15 to output a start-up sound or voice indicating the activation. While activating the voice assistant, the voice assistant unit 175 performs voice recognition of the voice (user's utterance) detected through the microphone 14. More specifically the voice assistant unit 175 transmits an audio signal of the voice detected through the microphone 14 to the voice recognition server 20 via the communication unit 11. Then the voice assistant unit acquires information on the contents of the voice (contents of the user's utterance) that is a result of the voice recognition by the voice recognition server 20. Then the voice assistant unit 175 executes answering processing based on the acquired recognition result. For instance, based on the utterance of the user, the voice assistant unit 175 controls to output information in the form of voice or images about weather, news, shops and sightseeing area, for example, or stream various contents, such as video contents and music contents.

(Examples of Determination Time)

The following describes a setting example of the voice detection determination time and of the keyword detection determination time. As described above, the voice detection determination time is a threshold to determine that the conversation does not continue. The voice detection unit 173 makes a determination based on the voice detection determination time to determine whether the state of detecting no voice continues a certain period of time or longer (i.e., whether there is silence of a certain period of time (no voice) or not). The keyword detection determination time is a threshold to determine that the conversation does not continue for a certain period of time or longer. The keyword detection unit 174 makes a determination based on the keyword detection determination time to determine whether a keyword appears within a certain period of time after the shifting to "Phase2" or not.

The voice detection determination time is set at 2 to seconds, for example. More specifically the voice detection determination time may be set at 2 seconds, for example. The keyword detection determination time is set at 5 to 10 seconds, for example. More specifically the keyword detection determination time may be set at 5 seconds, for example.

Although the keyword detection determination time is set longer than the voice detection determination time in the above example, the keyword detection determination time may be set shorter than the voice detection determination time. For instance, the voice detection determination time may be set at 3 to 5 seconds, and the keyword detection determination time may be set at 2 to 4 seconds. More specifically in one example, the voice detection determination time may be set at 3 seconds, and the keyword detection determination time may be set at 2 seconds. The voice detection determination time and the keyword detection determination time may be set at the same length of time.

The speed of conversation may vary with regions and types of languages. Therefore one of the voice detection determination time and the keyword detection determination time or both of them may be set based on the region setting or the language setting of the PC. For instance, each of options of "country" or "language setting" to be selected during the initial setting of the PC may be associated with one of values of the voice detection determination time and the keyword detection determination time or both of them. For instance, when the user selects a "country" or "language setting" during the initial setting of the PC, one of the voice detection determination time and the keyword detection determination time associated with the selected "country" or "language setting" or both of them may be set.

The speed of conversation differs also between individuals. Therefore the user may set one of the voice detection determination time and the keyword detection determination time or both of them. For instance, the user may set any length of time for one of the voice detection determination time and the keyword detection determination time or both of them, or may select any length of time from a plurality of predetermined setting lengths of time. When the user can set both of the voice detection determination time and the keyword detection determination time, the user may set them separately or may select from options each including the combination of settings of both of them. Instead of setting the length of time, the user may select items, such as "fast", "normal" and "slow". Then, the voice detection determination time and the keyword detection determination time that are set beforehand corresponding to the selected items may be set.

(Operation of Voice Assistant Activation Processing)

Figure 5:
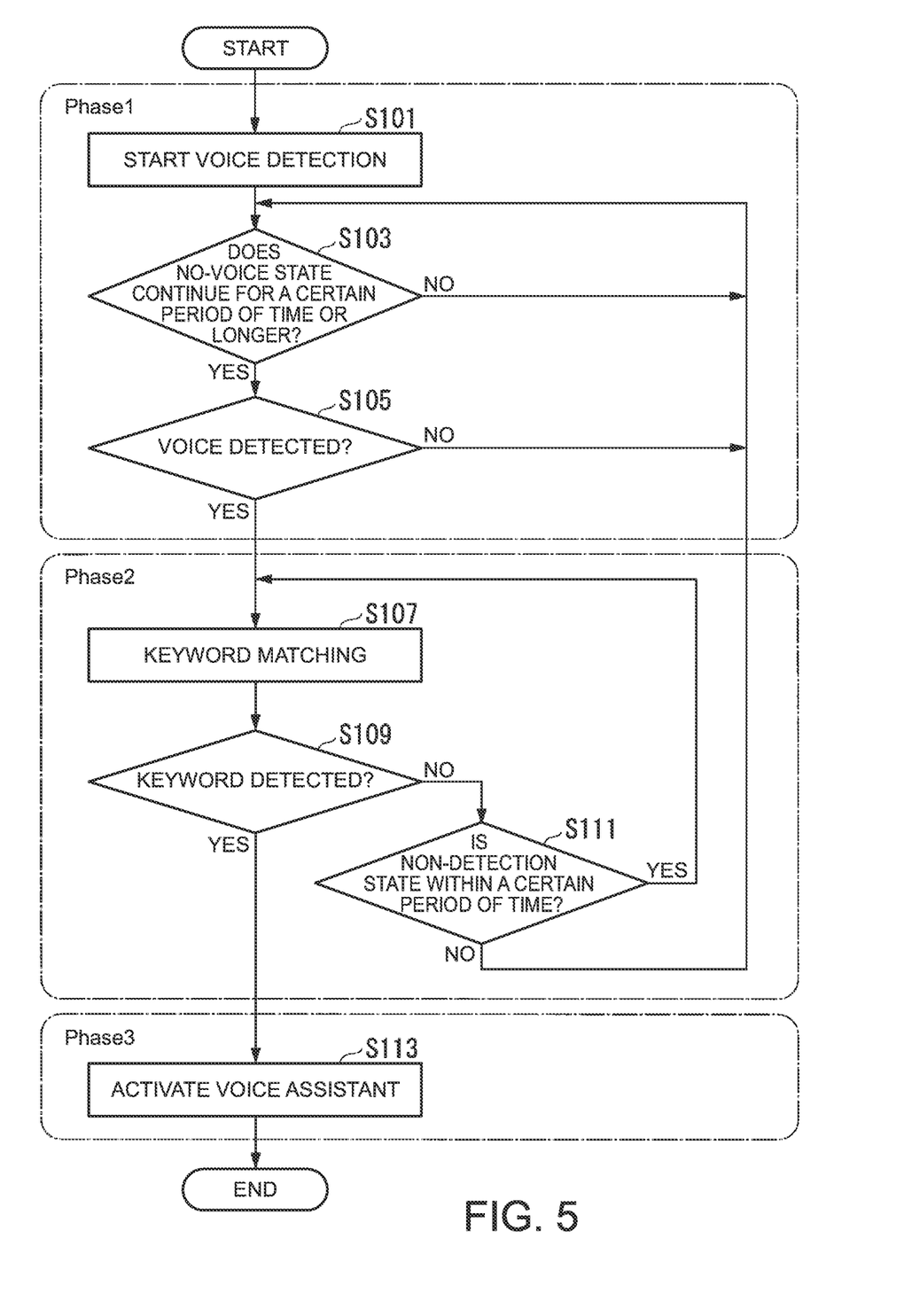
FIG. 5 is a flowchart showing one example of the voice assistant activation processing according to the present embodiment.

Next referring to FIG. 5, the following describes the operation of the voice assistant activation processing by the controller 170 of the terminal 10 to activate voice assistant when a keyword uttered by the user is detected. FIG. 5 is a flowchart showing one example of the voice assistant activation processing according to the present embodiment. The following assumes the case where the terminal 10 allows setting of Enable/Disable of the operation of the voice assistant, and Enable is set in this example.

The processing of Steps S101 to S105 in the following corresponds to "Phase1".

(Step S101) When the terminal 10 activates, the voice detection unit 173 starts the voice detection processing to detect voice (human voice) from the ambient sound based on an audio signal acquired from the microphone 14 via the input control unit 171. Then the procedure shifts to Step S103.

(Step S103) The voice detection unit 173 determines whether the state of detecting no voice continues for a certain period of time or longer. When the voice detection unit 173 determines that the state of detecting no voice does not continue for a certain period of time (voice detection determination time) or longer (NO), the voice detection unit continues the processing at Step S103. When the voice detection unit determines that such a state continues for a certain period of time or longer (YES), then the procedure shifts to the processing at Step S105.

(Step S105) The voice detection unit 173 determines whether voice (human voice) is detected or not. When the voice detection unit 173 determines that no voice (human voice) is detected (NO), the voice detection unit returns the procedure to Step S103. When the voice detection unit determines that voice (human voice) is detected (YES), the procedure shifts to Step S107. In other words, when the voice detection unit 173 detects voice after silence of a certain period of time or longer, then the procedure shifts to Step S107 (i.e., shifts to "Phase2").

The processing of Steps S107 to S111 in the following corresponds to "Phase2".

(Step S107) The keyword detection unit 174 checks the voice detected by the voice detection unit 173 for matching with a preset keyword (a keyword to activate the voice assistant) (keyword matching) so as to detect the keyword from the voice.

Then the procedure shifts to Step S109.

(Step S109) The keyword detection unit 174 determines based on a result of the keyword matching whether a keyword is detected or not from the voice detected by the voice detection unit 173. When no keyword is detected (NO), the keyword detection unit 174 shifts the procedure to Step S111. When a keyword is detected (YES), the keyword detection unit shifts the procedure to Step S113 (i.e., shifting to "Phase3").

(Step S111) The keyword detection unit 174 determines whether the time elapsed since the detection of the voice at Step S105 (i.e., after shifting to "Phase2") (i.e., the time when no keyword is detected) is within a certain period of time (keyword detection determination time) or not. When the keyword detection unit 174 determines that the time when no keyword is detected is within the certain period of time (YES), the procedure returns to Step S107 to continue the keyword detection processing. When the keyword detection unit 174 determines that the time when no keyword is detected is over the certain period of time (NO), the keyword detection unit stops the keyword detection processing, and returns the procedure to Step S103 (i.e., return to "Phase1").

In other words, when the keyword detection unit 174 detects a keyword within a certain period of time after the detection of voice at Step S105 (i.e., after shifting to "Phase2"), the procedure shifts to Step S113 ("Phase3").

The processing at the following Step S113 corresponds to "Phase3".

(Step S113) The voice assistant unit 175 activates the voice assistant while letting the output control unit 172 control the speaker 15 to output a start-up sound or voice indicating the activation.

Next the following describes a modified example of the voice assistant activation processing.

When the voice detection processing in "Phase1" is the first time after the activation of the terminal 10, the procedure may shift to "Phase2" when voice (human voice) is detected, irrespective of whether the state of detecting no voice continues for a certain period of time (voice detection determination time) or longer or not.

Figure 6:
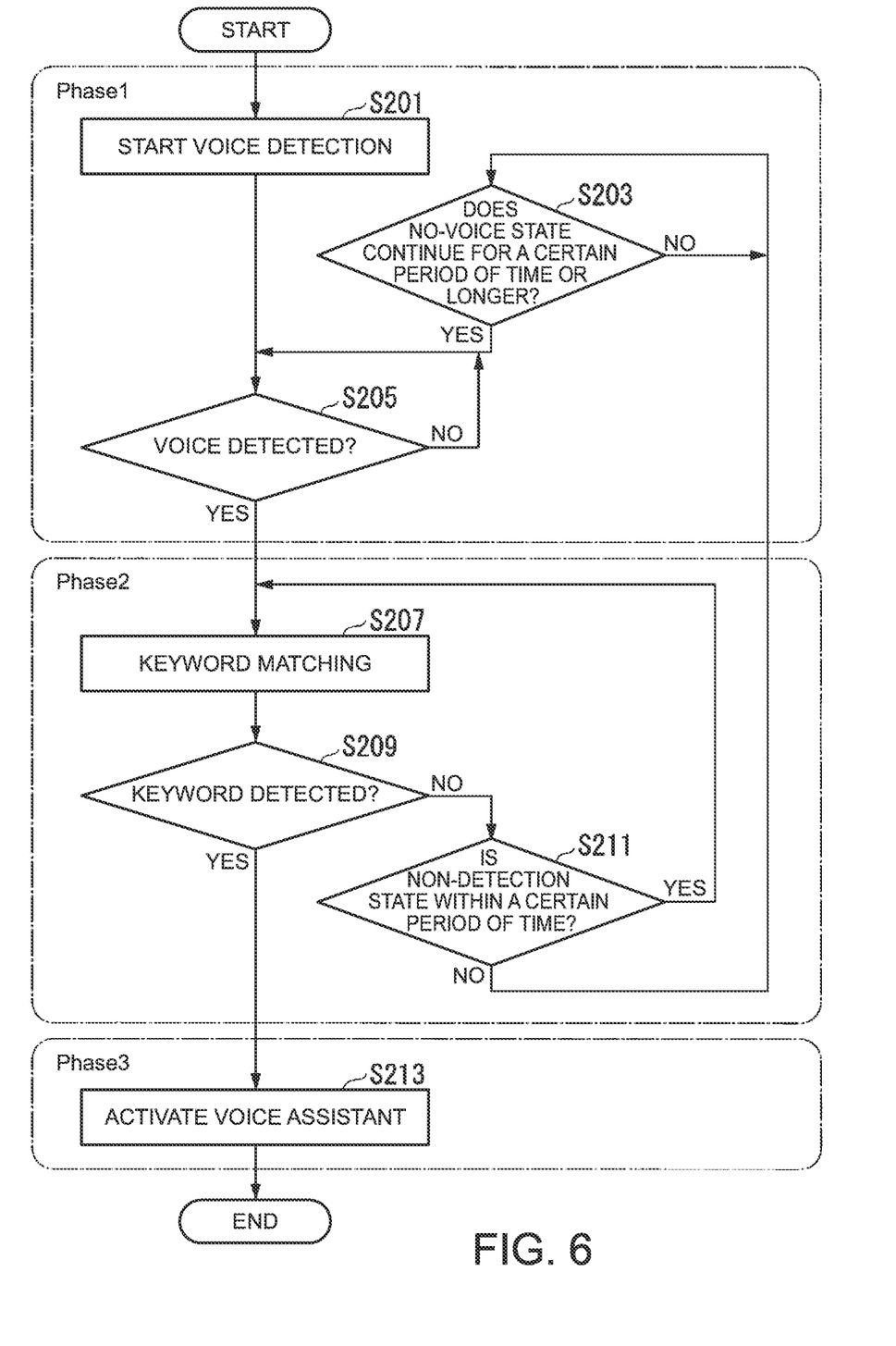
FIG. 6 is a flowchart showing a modified example of the voice assistant activation processing according to the present embodiment.

FIG. 6 is a flowchart showing the modified example of the voice assistant activation processing according to the present embodiment. The processing at Steps S201 to S213 in FIG. 6 corresponds to the processing at Steps S101 to S113 in FIG. 5, and is different only in the processing in "Phase1".

(Step S201) When the terminal 10 activates, the voice detection unit 173 starts the voice detection processing to detect voice (human voice) from the ambient sound based on an audio signal acquired from the microphone 14 via the input control unit 171. Then the procedure shifts to Step S205.

(Step S205) The voice detection unit 173 determines whether voice (human voice) is detected or not. When the voice detection unit 173 determines that no voice (human voice) is detected (NO), the voice detection unit continues the processing at Step S205. When the voice detection unit determines that voice (human voice) is detected (YES), the procedure shifts to Step S207. In other words, when the voice detection unit 173 detects voice, then the procedure shifts to Step S207 (i.e., shifts to "Phase2") irrespective of whether there is silent of a certain period of time or longer or not.

Meanwhile, when the procedure shifts to "Phase2" and then returns to "Phase1", then the procedure shifts to Step S207 (i.e., shifts to "Phase2") when voice is detected after silent of a certain period of time or longer. Specifically when the keyword detection unit 174 determines at Step S211 of "Phase2" that the time when no keyword is detected is over the certain period of time (NO), the keyword detection unit stops the keyword detection processing, and returns the procedure to Step S203 (i.e., return to "Phase1").

(Step S203) The voice detection unit 173 determines whether the state of detecting no voice continues for a certain period of time or longer. When the voice detection unit 173 determines that the state of detecting no voice does not continue for a certain period of time (voice detection determination time) or longer (NO), the voice detection unit continues the processing at Step S203. When the voice detection unit determines that such a state continues for a certain period of time or longer (YES), then the procedure shifts to the processing at Step S205. In this way, when the procedure shifts to "Phase2" and then returns to "Phase1", then the procedure shifts to Step S207 (i.e., shifts to "Phase2") when the voice detection unit 173 detects voice after silence of a certain period of time or longer.

(Power Consumption at Each Processing)

The following describes power consumption at each processing of "Phase1", "Phase2" and "Phase3". Since "Phase1", "Phase2", and "Phase3" perform different processing, their power consumption is different from each other. In "Phase1" and "Phase2", since the voice assistant does not activate, their power consumption is lower than in "Phase3", and the power consumption is still different between "Phase1" and "Phase2". While "Phase1" performs voice detection processing, "Phase2" performs keyword detection processing in addition to voice detection processing. Therefore power consumption is higher in "Phase2" than in "Phase1". In one example, while the power consumption in "Phase1" is about 500 µW, the power consumption in "Phase2" is about 70 mW. Therefore when no keyword is detected within a certain period of time in "Phase2" in the present embodiment, the procedure returns to "Phase1", whereby power consumption can be reduced in comparison with the case of continuing "Phase2".

As described above, the terminal 10 (one example of the electronic device) according to the present embodiment includes the voice detection unit 173 (one example of a first processing circuit), the keyword detection unit 174 (one example of a second processing circuit) and the voice assistant unit 175 (one example of a third processing circuit). The voice detection unit 173 detects voice from the ambient sound in "Phase1" (first processing). When the voice detection determination time detects such voice after the state of detecting no voice continues for a certain period of time (first determination time, voice detection determination time) or longer, the voice detection unit shifts the procedure to "Phase2" (second processing). The keyword detection unit 174 determines whether the voice detected from the ambient sound includes a specific word or not in "Phase2". When the keyword (the specific word) appears within a certain period of time (second determination time, keyword detection determination time) after the shifting to "Phase2", the keyword detection unit shifts the procedure to "Phase3" (third processing). When the keyword does not appear within the certain period time (second determination time, keyword detection determination time), the keyword detection unit does not shift the procedure to "Phase3". The voice assistant unit 175 activates voice assistant (one example of a specific function) in "Phase3". For instance, voice recognition is performed for the detected voice, and the voice assistant unit 175 executes answering processing based on the contents of the recognized voice.

In this way, the terminal 10 is configured so as to, when a keyword is detected within a certain period of time after the silence (no voice) of a certain period of time, activate the voice assistant. This can suppress the erroneous activation of the voice assistant without the user's intent of using the voice assistant when the keyword is included in a series of conversation or when the conversation includes a word similar to the keyword in sound. Therefore the terminal 10 can reduce the activation of the voice assistant when the user does not intend to use the voice assistant. The terminal 10 therefore can reduce the false acceptance ratio when a user talks to the electronic device with a keyword to execute voice assistant. Since the terminal 10 can prevent the voice assistant from reacting at a timing that the user does not intend, this can reduce interruption of the user's conversation or work. Further the user does not feel that the voice assistant keeps the ears turned toward the conversation, and so this can eliminate the uncomfortable feeling of the user about the voice assistant.

When the keyword detection unit 174 does not find the keyword within a certain period of time (second determination time, keyword detection determination time) after the shifting to "Phase2", the procedure may shift to "Phase1".

In this way, the terminal 10 is configured so that, after "Phase1" detects voice and so the procedure shifts to "Phase2" to start the detection of keyword, when no keyword is detected within a certain period of time, the detection of a keyword is stopped and the procedure returns to "Phase1". Thereby power consumption can be reduced in comparison with the case of continuing the keyword detection processing in "Phase2" until the keyword is detected.

When the keyword detection unit 174 does not find a keyword within a certain period of time (second determination time, keyword detection determination time) after the shifting to "Phase2", the procedure may not shift to "Phase1", and still remain in "Phase2" even when the keyword is detected after that. This case does not have the effect of reducing power consumption, which can be obtained by shifting to "Phase1". However, this can suppress the erroneous activation of the voice assistant without the user's intent of using the voice assistant when the keyword is included in a series of conversation or when the conversation includes a word similar to the keyword in sound, because it prevents the procedure from shifting to "Phase3". In this case, when the continuous state of detecting no voice by the voice detection unit 173 is detected for a certain period of time (first determination time, voice detection determination time) or longer, then the keyword detection unit 174 may reset the counted time after shifting to "Phase2", and may determine again whether a keyword appears within a certain period of time (second determination time, keyword detection determination time).

At least one of the voice detection determination time and the keyword detection determination time may be set based on the region setting or the language setting. This allows the terminal 10 to detect a keyword correctly when the speed of conversation varies with regions or characteristics of languages.

The user may set at least one of the voice detection determination time and the keyword detection determination time. This allows the terminal 10 to detect a keyword correctly irrespective of individual differences in speed of conversation, because the user can set such determination time based on their own speed of conversation.

The above embodiment describes the example of voice recognition processing performed in the cloud environment including the voice recognition server 20. Instead, the terminal 10 may have the function of voice recognition processing.

The above embodiment describes the example where the function activated in "Phase3" is voice assistant, and the function is not limited to the voice assistant. For instance, the function activated in "Phase3" may be applied to various functions, such as specific application software, a power switch of other PCs, and a power switch of home electrical appliance having a communication function (known as an IoT home electrical appliance or smart home electrical appliance). In this way, the terminal 10 is configured so as to, when a keyword is detected within a certain period of time after the silent (no voice) of a certain period of time, activate such a specific function. This can suppress the erroneous activation of the specific function without the user's intent of using the function when the keyword is included in a series of conversation or when the conversation includes a word similar to the keyword in sound. Therefore the terminal 10 can reduce the activation of the specific function when the user does not intend to use the function. The terminal 10 therefore can reduce the false acceptance ratio when a user talks to the terminal with a keyword to execute the specific function.

The above-stated terminal 10 internally includes a computer system. A program to implement the functions of various configurations of the terminal 10 as stated above may be stored in a computer-readable recording medium, and the processing at the various configurations of the terminal 10 may be performed by causing the computer system to read and execute the program stored in this recording medium. "Causing the computer system to read and execute the program stored in the recording medium" includes installing of such a program in the computer system. The "computer system" here includes an OS and hardware, such as peripherals. The "computer system" may include a plurality of computer devices connected via a network, including the internet and communication lines such as WAN, LAN and dedicated lines. The "computer readable recording medium" is a portable medium, such as flexible disk, a magneto-optical disc, a ROM, or a CD-ROM, as well as a memory internally stored in the computer system, such as hard disk. In this way, the recording medium to store the program may be a non-transient recording medium, such as a CD-ROM.

The recording medium also includes an internal or external recording medium where a distribution server can access to distribute the program. The program may be divided into a plurality of pieces. After these pieces of program may be downloaded at different timings, they may be combined by the configurations of the terminal 10. Alternatively, different distribution servers may distribute these divided pieces of program. The "computer readable recording medium" also includes the one that can hold a program for a certain period of time, as in a server that receives a program transmitted via a network or a volatile memory (RAM) in the computer system as the client. The program may implement a part of the functions as stated above. The program may be a differential file (differential program) that can implement the above functions by combining it with a program which is already stored in the computer system.

A part or all of the functions that the terminal 10 of the above-described embodiment has may be implemented as an integrated circuit, such as a LSI (Large Scale Integration). Each of the functions as stated above may be implemented as one processor, or a part or all of the functions may be implemented as one processor in an integrated manner. A technique for integrated circuit is not limited to a LSI, and an integrated circuit may be realized using a dedicated circuit or a general-purpose processor. If a technique for integrated circuit that replaces LSIs becomes available with the development of a semiconductor techniques, an integrated circuit based on such a technique may be used.

That is the detailed description of one embodiment of the present invention with reference to the accompanying drawings. The specific configuration is not limited to the embodiment as stated above, and the embodiment can be variously changed in design or the like without departing from the scope of the invention.

The invention claimed is:

1. An electronic device, comprising:
   a first processing circuit configured to detect an absence of a voice and a presence of the voice, regardless of word content, from ambient sounds in a first processing;
   if the first processing circuit detects the presence of the voice, regardless of word content, then the first circuit continues to detect for the absence of the voice for a pre-set first period of time or longer;
   if the first processing circuit detects the absence of the voice for less than the first period of time, then the first processing circuit continues to detect for the absence of the voice for the first period of time or longer;
   if the first processing circuit detects the absence of the voice for the first period of time or longer, then the electronic device shifts procedure to a second processing;
   a second processing circuit configured to determine whether the voice detected from the ambient sounds includes a specific word or not in the second processing;
   if the second processing circuit determines that the specific word is included in the voice within a pre-set second period of time during the second processing, then the electronic device shifts the procedure to a third processing;
   if the second processing circuit determines that the specific word is not included in the voice within the second period of time, then the electronic device does not to shift the procedure to the third processing and instead shifts the procedure to the first processing; and
   a third processing circuit configured to activate a voice assistant function in the third processing.

2. The electronic device according to claim 1, wherein the third processing circuit is configured to:
   execute answering processing based on contents of the detected voice that are recognized by voice recognition in the third processing.

3. The electronic device according to claim 1, wherein at least one of the first period of time and the second period of time is set based on a region setting or a language setting.

4. The electronic device according to claim 1, wherein a user can set at least one of the first period of time and the second period of time.

5. A control method in an electronic device, comprising:
   detecting an absence of a voice and a presence of the voice, regardless of word content, from ambient sounds in a first processing;
   if the first processing detects the presence of the voice, regardless of word content, then the first processing continues to detect for the absence of the voice for a pre-set first period of time or longer;
   if the first processing detects the absence of the voice for less than the first period of time, then the first processing continues to detect for the absence of the voice for the first period of time or longer;
   if the first processing detects the absence of the voice for the first period of time or longer, then shifting to a second processing;
   in the second processing, detecting an absence and a presence of a specific word in the voice;
   if the second processing determines that the specific word is included in the voice within a pre-set second period of time during the second processing, then shifting to a third processing;
   if the second processing circuit determines that the specific word is not included in the voice within the second period of time, then not shifting to the third processing and instead shifts the procedure to the first processing; and
   activating a voice assistant function in the third processing.

* * * * *